（12）United States Patent
Parkerson et al.

(10) Patent No.: US 10,587,099 B1
(45) Date of Patent: Mar. 10, 2020

(54) BUS BAR ASSEMBLIES, POWER DISTRIBUTION SYSTEMS, AND METHODS

(71) Applicant: Siemens Industry, Inc., Alpharetta, GA (US)

(72) Inventors: Jason Parkerson, Mansfield, TX (US); Jason P. Wiant, Bedford, TX (US)

(73) Assignee: SIEMENS INDUSTRY, INC., Alpharetta, GA (US)

( * ) Notice: Subject to any disclaimer, the term of this patent is extended or adjusted under 35 U.S.C. 154(b) by 0 days.

(21) Appl. No.: 16/160,095

(22) Filed: Oct. 15, 2018

(51) Int. Cl.
| | |
|---|---|
| *H02B 1/21* | (2006.01) |
| *H02B 1/04* | (2006.01) |
| *H02G 5/02* | (2006.01) |
| *H02G 5/06* | (2006.01) |
| *H02B 1/30* | (2006.01) |

(52) U.S. Cl.
CPC .............. *H02B 1/21* (2013.01); *H02B 1/04* (2013.01); *H02B 1/30* (2013.01); *H02G 5/025* (2013.01); *H02G 5/06* (2013.01)

(58) Field of Classification Search
CPC ... H02B 1/21; H02B 1/56; H02B 1/06; H02B 13/025; H02B 1/20; H02B 1/26; H02B 11/12; H02B 1/202; H02B 13/005; H01R 25/162; H01R 25/161; H01R 4/38; H02G 5/06
USPC ....... 361/611, 637, 648, 605, 624, 639, 614, 361/638, 650, 622; 174/70 B, 71 B, 72 B, 174/88 B, 68.2, 99 B, 149 B, 129 B, 174/133 B; 439/213, 212
See application file for complete search history.

(56) References Cited

U.S. PATENT DOCUMENTS

| | | | | |
|---|---|---|---|---|
| 3,213,183 | A | * 10/1965 | Weimer | ................... H02G 5/06 174/33 |
| 6,040,976 | A | 3/2000 | Bruner et al. | |
| 6,111,745 | A | 8/2000 | Wilkie et al. | |
| 6,141,206 | A | 10/2000 | Bruner et al. | |
| 6,169,248 | B1 | 1/2001 | Rowe et al. | |
| 6,433,999 | B1 * | 8/2002 | Muse | ....................... H02B 1/14 312/223.2 |
| 7,075,021 | B2 | 7/2006 | Rowe et al. | |
| 7,449,635 | B2 | 11/2008 | Wiant | |
| 7,558,053 | B2 * | 7/2009 | Moore | ..................... H02B 1/21 174/71 B |
| 7,719,823 | B2 | 5/2010 | Josten et al. | |
| 8,437,118 | B2 | 5/2013 | Kasza et al. | |
| 8,717,741 | B2 | 5/2014 | Valenzuela | |
| 9,144,161 | B2 | 9/2015 | Kozuru et al. | |
| 9,391,413 | B2 | 7/2016 | Blasbalg et al. | |
| 9,608,413 | B2 | 3/2017 | Kubota et al. | |
| 9,622,374 | B2 | 4/2017 | Bhattacharya et al. | |
| 9,705,294 | B2 | 7/2017 | Kubota et al. | |

(Continued)

*Primary Examiner* — Mandeep S Buttar (57) ABSTRACT

A power distribution system includes a first bus including a first bus bar and a second bus bar. A first portion of the first bus is located in a position where the first bus bar and the second bus bar extend parallel to each other. A space is located between the first bus bar and the second bus bar in the first portion of the first bus. A run-over bus includes two or more run-over bus bars, wherein at least a cross-sectional portion of at least one of the run-over bus bars is located in the space and the at least one run-over bus bar extends parallel to the first bus bar and the second bus bar. Other systems and methods are disclosed.

16 Claims, 9 Drawing Sheets

(56) References Cited

U.S. PATENT DOCUMENTS

2002/0021548 A1* 2/2002 Muse .................. H02B 1/14
                                                361/641
2010/0328850 A1* 12/2010 Remmert ............ H02B 1/056
                                                361/634

* cited by examiner

BUS BAR ASSEMBLIES, POWER DISTRIBUTION SYSTEMS, AND METHODS

FIELD

The present disclosure relates to assemblies, systems, and methods for electrical power distribution, and specifically to run-over buses.

BACKGROUND

In power distribution systems (e.g., switchgear and switchboard systems), moving the components as close together as possible minimizes the overall space envelope and enables improved user accessibility. Such close proximity of various buses, such as run-over buses and thru buses can cause movement and/or bending of various components due to large electromagnetic forces present during short circuit events. If such bending is sufficiently large, it is possible to have phase-to-phase contact and/or arcing.

Thus, there is a need for improvements to various bus components to improve user accessibility thereof and allow close proximity location thereof.

SUMMARY

According to a first aspect, a power distribution system is provided. The power distribution system includes a first bus comprising a first bus bar and a second bus bar; a first portion of the first bus located in a position where the first bus bar and the second bus bar extend parallel to each other; a space between the first bus bar and the second bus bar in the first portion of the first bus; and a run-over bus comprising two or more run-over bus bars, wherein a cross-sectional portion of at least one of the run-over bus bars is located in the space, and wherein the at least one run-over bus bar extends parallel to the first bus bar and the second bus bar in the space.

According to another aspect, a power distribution system is provided. The power distribution system includes a first cabinet assembly; a second cabinet assembly; a horizontal bus extending between the first cabinet assembly and the second cabinet assembly, the horizontal bus comprising a first horizontal bus bar and a second horizontal bus bar vertically aligned with the first horizontal bus bar; a first portion of the horizontal bus located in a position where the first horizontal bus bar and the second horizontal bus bar extend parallel to each other; a space between the first horizontal bus bar and the second horizontal bus bar in the first portion of the horizontal bus; and a run-over bus extending between the first cabinet assembly and the second cabinet assembly, the run-over bus comprising two or more run-over bus bars, wherein a cross-section of at least one of the run-over bus bars is located entirely in the space, and wherein the at least one run-over bus bar extends parallel to the first horizontal bus bar and the second horizontal bus bar in the space.

According to another aspect, a method of making a power distribution system is provided. The method includes providing a first bus comprising a first bus bar and a second bus bar, wherein a first portion of the first bus is located in a position where the first bus bar and the second bus bar extend parallel to each other; providing a space between the first bus bar and the second bus bar in the first portion of the first bus; providing a run-over bus comprising two or more run-over bus bars; and extending a cross-section of at least one of the run-over bus bars entirely in the space, wherein the at least one bus bar extends parallel to the first bus bar and the second bus bar in the space.

Still other aspects, features, and advantages of the present disclosure may be readily apparent from the following description by illustrating a number of example embodiments, including the best mode contemplated for carrying out the present disclosure. The present disclosure may also be capable of other and different embodiments, and its details may be modified in various respects, all without departing from the substance and scope of the present disclosure. The disclosure covers all modifications, equivalents, and alternatives falling within the substance and scope of the claims.

BRIEF DESCRIPTION OF DRAWINGS

The drawings, described below, are for illustrative purposes only and are not necessarily drawn to scale. The drawings are not intended to limit the scope of the disclosure in any way. Wherever possible, the same or like reference numbers will be used throughout the drawings to refer to the same or like parts.

DETAILED DESCRIPTION

Reference will now be made in detail to the example embodiments of this disclosure, which are illustrated in the accompanying drawings. Power distribution systems, including switchgears and switchboards, may distribute electric power to a plurality of different systems, locations, and devices. For example, an input of a power distribution system may be connected to a main power line, such as the main power line to a building. The power distribution systems may include circuits and the like that distribute power to a plurality of locations, such as different floors, areas in a building, or different pieces of heavy equipment. Current flow through power distribution systems may be several hundred amperes to 150 kA or greater. In some embodiments, the power distribution systems may monitor current flow to the different locations and may include circuit breakers to disconnect power to locations that draw current in excess of a predetermined amperage.

Power distribution systems may be fabricated as individual cabinet structures. A plurality of cabinet structures may abut one another to form a power distribution system. The front of the cabinet structures may include user controls, such as circuit breakers, and monitoring devices. In order to conserve space in facilities, the interior of the power distribution systems may be densely packed with controls, bus bars, circuit breakers, and other components. Lug terminal assemblies that electrically couple to the bus bars may be located in the cabinet assemblies and may be accessible to users from behind the panels (e.g., doors) of the cabinet assemblies. Thus, locations of power distribution systems can be such that they enable user access to all or many terminal lugs and the like through the front of the cabinet assemblies. Some embodiments of power distribution systems may include both front and rear access.

Power distribution systems including unique bus bars and bus bar routings are disclosed herein in FIGS. 1-6. The configurations of power distribution systems disclosed herein may enable power distribution systems to be more compact.

Figure 1:
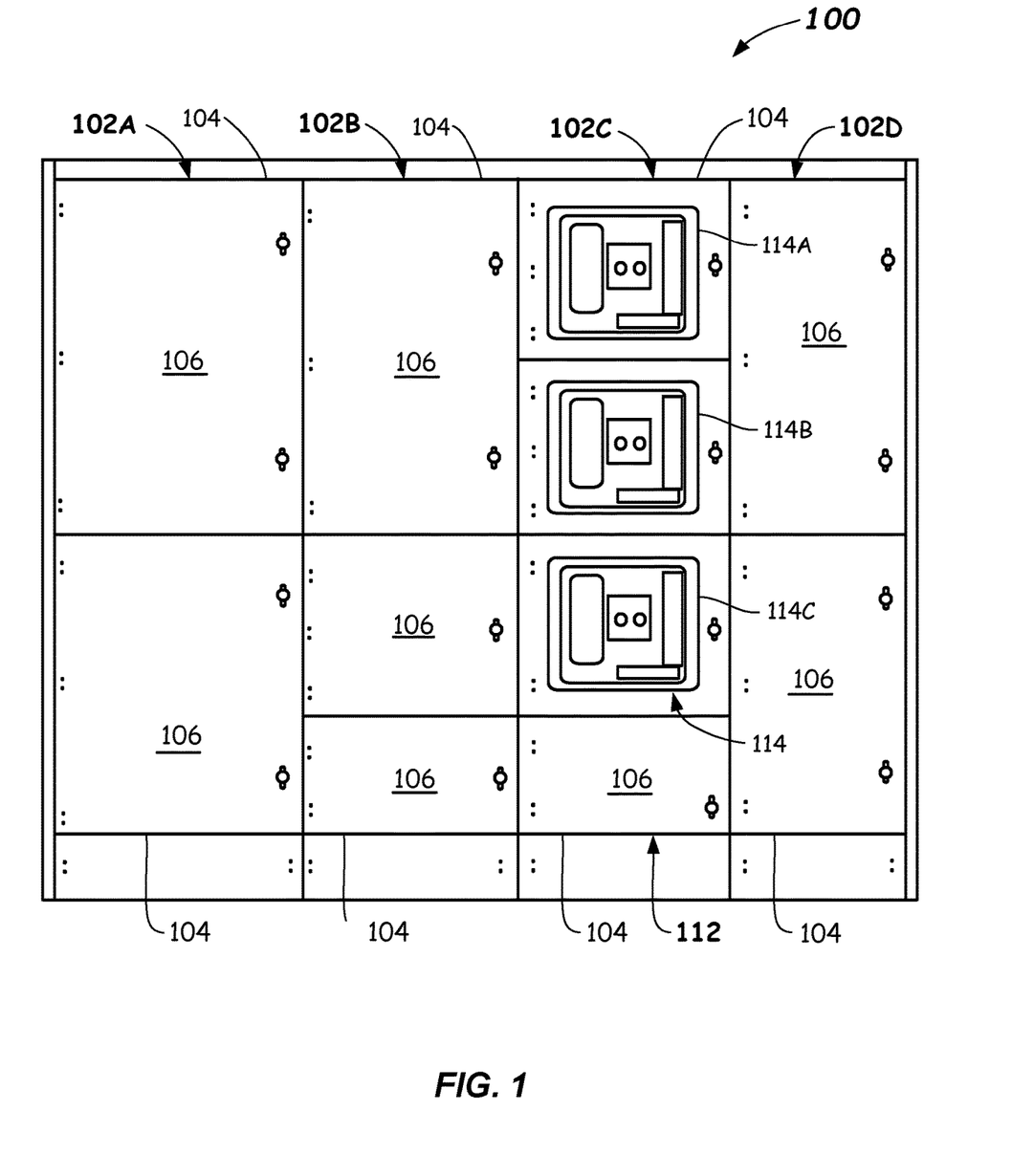
FIG. 1 illustrates a front elevation view of an exterior of a power distribution system (e.g., a switchgear or a switchboard) according to one or more embodiments.

Reference is now made to FIG. 1, which illustrates a front view of an embodiment of a power distribution system 100. The power distribution system 100 may be a switchgear or a switchboard. The power distribution system 100 may include a plurality of cabinet assemblies 102A-102D that may extend vertically and may be adjacent one another. The cabinet assemblies 102A-102D may be referred to individually as the first cabinet assembly 102A, the second cabinet assembly 102B, the third cabinet assembly 102C, and the fourth cabinet assembly 102D. Each of the cabinet assemblies 102A-102D may include one or more compartments 104 (a few labelled), wherein each of the compartments 104 may include a panel 106 (a few labeled) that covers its respective compartment.

The third cabinet assembly 102C may include user interfaces 114, which may include controls, such as circuit breakers and other controllers that control and/or monitor power distribution to different locations. The components within the third cabinet assembly 102C may be collectively referred to as the circuit breaker section 112. The embodiment of the circuit breaker section 112 depicted in FIG. 1 may include three user interfaces 114 referred to individually as a first user interface 114A, a second user interface 114B, and a third user interface 114C.

The fourth cabinet assembly 102D may contain lug terminal assemblies, buses, cables, and the like (not shown in FIG. 1) that electrically connect the power distribution system 100 to locations where power is distributed, such as locations in a building and power equipment. The fourth cabinet assembly 102D may also contain buses (not shown in FIG. 1) that carry line power and load power. The first cabinet assembly 102A and the second cabinet assembly 102B may include bus bars, terminal assemblies, and the like that conduct power from outside the power distribution system 100 and throughout the power distribution system 100.

Figure 2:
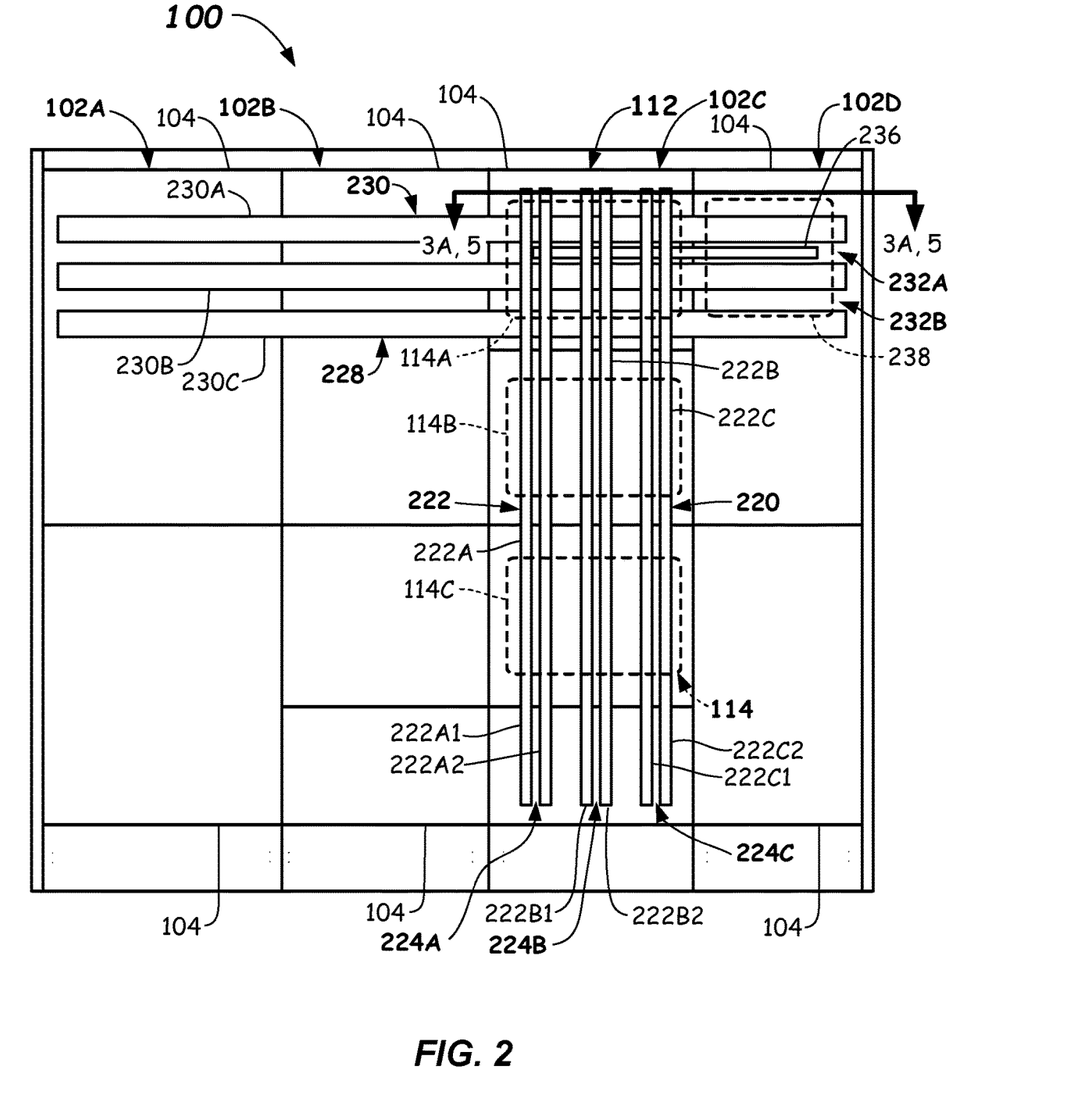
FIG. 2 illustrates a power distribution system with front panels removed showing bus bars within cabinet assemblies according to one or more embodiments.

Additional reference is made to FIG. 2, which illustrates the power distribution system 100 with the panels 106 removed to better illustrate some buses located within the power distribution system 100. The power distribution system 100 may include more or less buses and conductors than illustrated in FIG. 2. References to directions, such as horizontal and vertical directions, used herein to refer to bus directions and directions of other components are solely to describe some embodiments of the power distribution system 100 and do not limit the scope of this disclosure.

A vertical bus 220 may extend vertically within the third cabinet assembly 102C. The vertical bus 220 may include one or more vertical bus bars 222. The terms "vertical bus" and "vertical bus bars" are used to describe some embodiments of the power distribution system 100 and are not intended to limit the components to extending in specific directions. The vertical bus 220, the vertical bus bars 222, and components thereof may extend in directions other than vertical (e.g., horizontal). The vertical bus 220 and the vertical bus bars 222 are sometimes referred to herein as the "second bus" and the "second bus bars," respectively.

The vertical bus 220 depicted in FIG. 2 may include a first vertical bus bar 222A, a second vertical bus bar 222B, and a third vertical bus bar 222C. The first vertical bus bar 222A may conduct an A-phase of a voltage, the second vertical bus bar 222B may conduct a B-phase of the voltage, and the third vertical bus bar 222C may conduct a C-phase of the voltage. Each of the vertical bus bars 222 may include two channels (e.g., conductors) that are electrically coupled together. The first vertical bus bar 222A may include a first channel 222A1 and a second channel 222A2 with a first gap 224A located there between. The second vertical bus bar 222B may include a first channel 222B1 and a second channel 222B2 with a second gap 224B located there between. The third vertical bus bar 222C may include a first channel 222C1 and a second channel 222C2 with a third gap 224C located there between.

The power distribution system 100 may also include a horizontal bus 228 that may include one or more horizontal bus bars 230. The terms "horizontal bus" and "horizontal bus bars" are used to describe some embodiments of the power distribution system 100 and are not intended to limit the components to extending in specific directions. The horizontal bus 228, the horizontal bus bars 230, and components thereof may extend in directions other than horizontal (e.g., vertical). The horizontal bus 228 and the horizontal bus bars 230 are sometimes referred to herein as the "first bus" and the "first bus bars," respectively. At least portions of the horizontal bus bars 230 may be vertically aligned and parallel to each other.

The horizontal bus 228 may extend between the cabinet assemblies 102A-102D. The horizontal bus 228 depicted in FIG. 2 includes three horizontal bus bars 230 referred to individually as a first horizontal bus bar 230A, a second horizontal bus bar 230B, and a third horizontal bus bar 230C. The first horizontal bus bar 230A may conduct an A-phase of a voltage, the second horizontal bus bar 230B may conduct a B-phase of the voltage, and the third horizontal bus bar 230C may conduct a C-phase of the voltage. A first space 232A may be located between the first horizontal bus bar 230A and the second horizontal bus bar 230B. A second space 232B may be located between the second horizontal bus bar 230B and the third horizontal bus bar 230C. In some embodiments, the full lengths of the horizontal bus bars 230 may not be parallel to each other. In such embodiments, the first space 232A and the second space 232B may be located between portions of the horizontal bus bars 230 that are parallel to each other. The terms "gaps" and "spaces" may be used interchangeably herein. In some embodiments, one or more of the horizontal bus bars 230 may be dual channel bus bars, meaning that they include two or more conductors that are electrically connected together.

The power distribution system 100 may include a run-over bus 236. In the embodiment of FIG. 2, the run-over bus 236 may extend between the third cabinet assembly 102C and the fourth cabinet assembly 102D and may conduct current there between. The run-over bus 236 may extend within a single cabinet assembly and/or between other cabinet assemblies. The run-over bus 236 may, for example, conduct current between the first user interface 114A (e.g., a circuit breaker) and a lug terminal assembly 238. The lug terminal assembly 238 may include lug pads (not shown) that connect to cables to distribute power external to the power distribution system 100. At least a portion of the run-over bus 236 may extend in at least one of the first space 232A and the second space 232B between the horizontal bus bars 230. At least a portion of the run-over bus 236 may also pass through at least one of the gaps 224A-224C in the vertical bus bars 222. In some embodiments, at least a portion of the run-over bus 236 may pass between vertical bus bars 222 in the vertical bus 220.

Figure 3A:
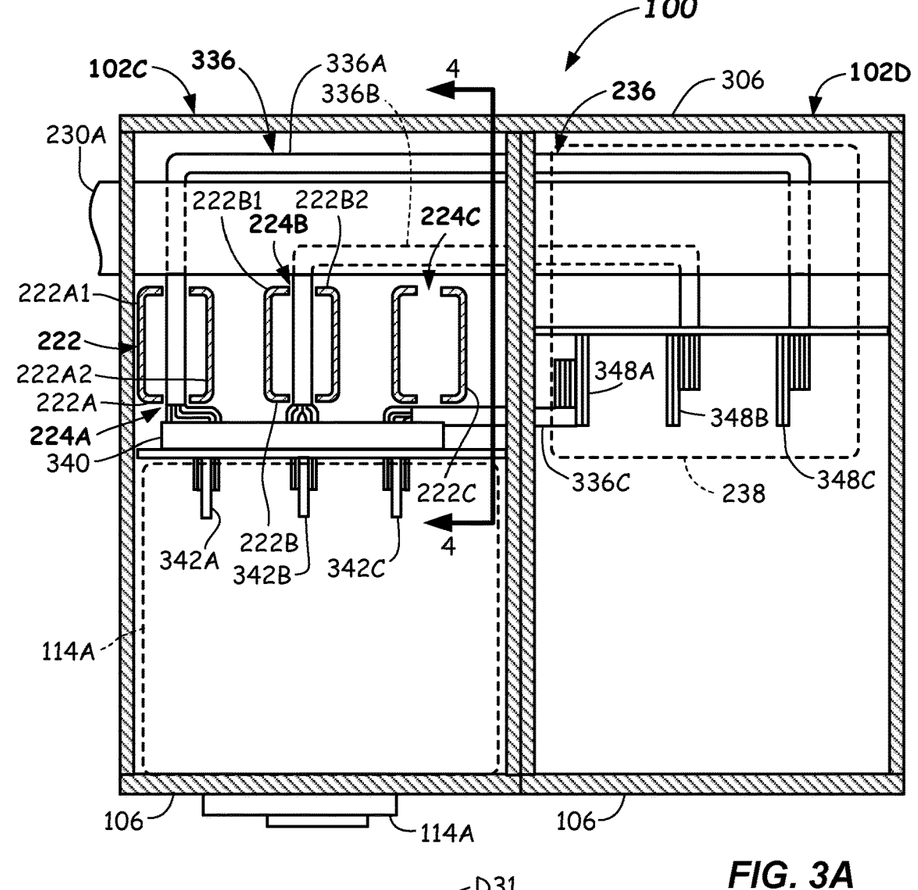
FIG. 3A illustrates a top, plan, cross-sectional view of portions of a power distribution system according to one or more embodiments.

Additional reference is made to FIG. 3A, which illustrates a top, cross-sectional view of portions of the power distribution system 100. Specifically, FIG. 3A illustrates a top, cross-sectional view of the third cabinet assembly 102C and the fourth cabinet assembly 102D. As shown in FIG. 3A, the power distribution system 100 may include a back panel 306 that may be located opposite the panels 106. The run-over bus 236 depicted in FIG. 3A may include one or more run-over bus bars 336. In the embodiment depicted in FIG. 3A, the run-over bus 236 includes three run-over bus bars 336, referred to individually as a first run-over bus bar 336A, a second run-over bus bar 336B, and a third run-over bus bar 336C. The run-over bus bars 336 may electrically and/or mechanically couple to a terminal assembly 340 that may be a component of or coupled to the first user interface 114A. The first run-over bus bar 336A may be coupled to a first conductor 342A, the second run-over bus bar 336B may be coupled to a second conductor 342B, and the third run-over bus bar 336C may be coupled to a third conductor 342C. The conductors 342A-342C may be coupled to one or more circuit breakers (not shown in FIG. 3A). The first run-over bus bar 336A may also be connected to a first conductor 348A in the lug terminal assembly 238. The second run-over bus bar 336B may also be connected to a second conductor 348B in the lug terminal assembly 238. The third run-over bus bar 336C may also be connected to a third conductor 348C in the lug terminal assembly 238. The locations and order of the conductors 348A-348C are provided solely as example locations in FIG. 3B and other figures herein.

Figure 3B:
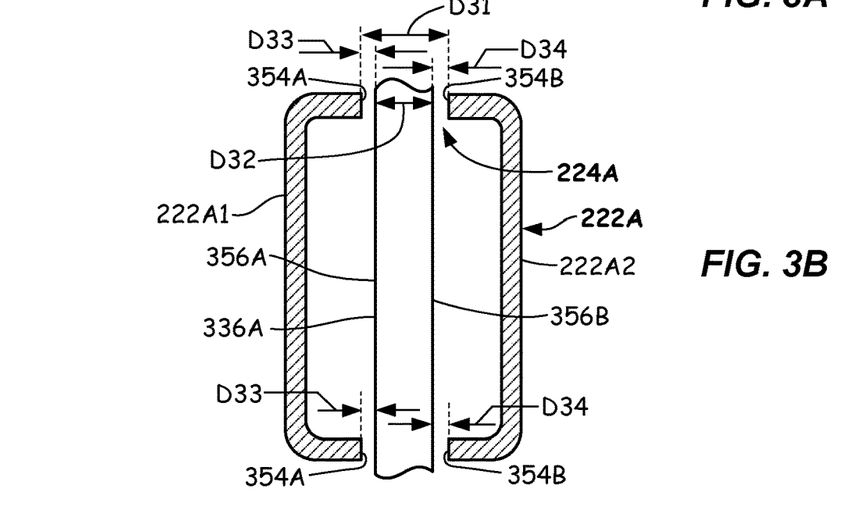
FIG. 3B illustrates an enlarged view of a vertical bus bar with a run-over bus bar extending there through according to one or more embodiments.

Additional reference is made to FIG. 3B, which illustrates an enlarged top cross-sectional view of the first vertical bus bar 222A and the first run-over bus bar 336A passing there through. The configuration of the second vertical bus bar 222B and the second run-over bus bar 336B may be substantially similar or identical to the first vertical bus bar 222A and the first run-over bus bar 336A described herein. The first channel 222A1 and the second channel 222A2 may both be C-shaped. The first channel 222A1 may have ends 354A and the second channel 222A2 may have ends 354B facing the ends 354A and separated by a distance D31. The first run-over bus bar 336A may have a first side 356A and a second side 356B separated by a distance D32. The distance D32 may be less than the distance D31, which enables the first run-over bus bar 336A to pass between the first channel 222A1 and the second channel 222A2 of the first vertical bus bar 222A. The ends 354A and the first side 356A may be separated by a distance D33 and the ends 354B and the second side 356B may be separated by a distance D34. In some embodiments, the distance D33 and the distance D34 may be the same. In some embodiments, the distance D33 and the distance D34 and may be large enough to prevent forces (e.g., seismic forces) from causing the first vertical bus bar 222A and the first run-over bus bar 336A to contact each other. In other embodiments, the first channel 222A1 and the second channel 222A2 may be flat or have shapes other than C-shapes.

A small footprint of the power distribution system 100 and access to the components, such as lug pads, may be achieved, at least in part, by the routing of the run-over bus bars 336 of the run-over bus 236 through the gaps 224A-224C in the vertical bus bars 222 as described herein. In the example of FIG. 3A, the first run-over bus bar 336A may pass through the first gap 224A between the first channel 222A1 and the second channel 222A2 of the first vertical bus bar 222A. The second run-over bus bar 336B may pass through the second gap 224B between the first channel 222B1 and the second channel 222B2 of the second vertical bus bar 222B. At least a portion of both the first run-over bus bar 336A and the second run-over bus bar 336B may extend through or be located in the first space 232A. In some embodiments, a cross-sectional portion of at least one of the run-over bus bars 336 may be located in the first space 232A. In some embodiments, a cross-section of at least one of the run-over bus bars 336 may be located entirely in the first space 232A. In some embodiments, a cross-section of the first run-over bus bar 336A and a cross-section of the second run-over bus may both be located entirely in the first space 232A.

The power distribution system 100 may include braces and supports to maintain the various bus bars in fixed positions For example, during high current events, such as short circuit events, strong electromagnetic forces may be generated between bus bars conducting different phases. The supports and braces may prevent the bus bars from bending and contacting each other, which could cause arcing. Electromagnetic forces may be reduced by having the phases the run-over bus bars 336 the same as the vertical bus bars 222 through which they pass. For example, the first run-over bus bar 336A and the first vertical bus bar 222A may conduct the A-phase of a voltage. The second run-over bus bar 336B and the second vertical bus bar 222B may conduct the B-phase of the voltage.

Figure 4:
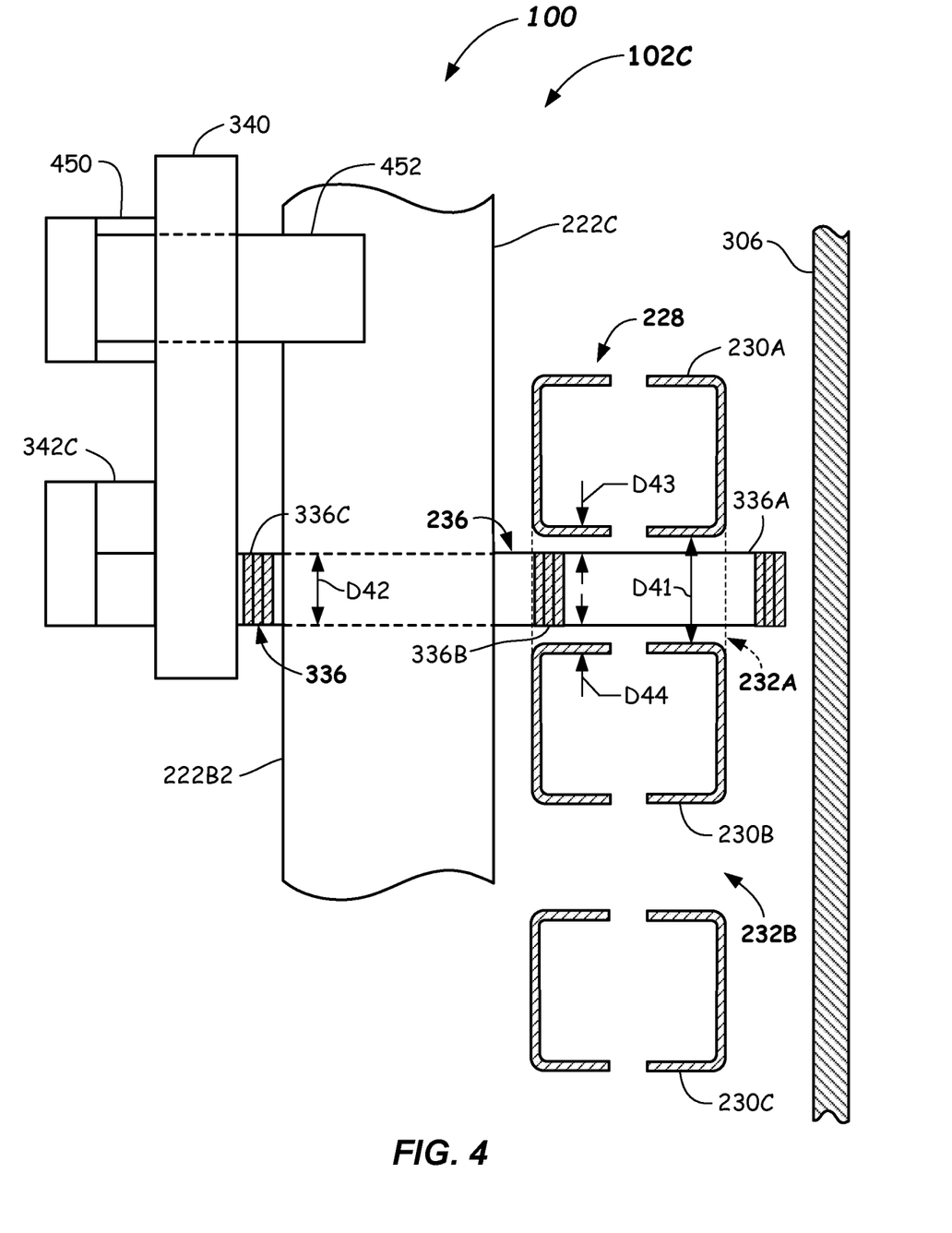
FIG. 4 illustrates a partial cross-sectional view of a cabinet assembly of a power distribution system and the location of a first run-over bus bar relative to other bus bars according to one or more embodiments.

Additional reference is made to FIG. 4, which illustrates a side, partial cross-sectional view of the third cabinet assembly 102C and the location of the run-over bus bars 336 of the run-over bus 236. In the embodiment depicted in FIG. 4, the first run-over bus bar 336A extends through the first vertical bus bar 222A and in the first space 232A between the first horizontal bus bar 230A and the second horizontal bus bar 230B. The first run-over bus bar 336A may extend parallel to both the first horizontal bus bar 230A and the second horizontal bus bar 230B. For example, a cross-section of the first run-over bus bar 336A may be located entirely in the first space 232A and the first run-over bus bar 336A may extend parallel to the first horizontal bus bar 230A and the second horizontal bus 230B bar in the first space 232A.

The second run-over bus bar 336B may extend through the second gap 224B and may extend parallel to at least a portion of both the first horizontal bus bar 230A and the second horizontal bus bar 230B and in the first space 232A. For example, a cross-section of the second run-over bus bar 336B may be located entirely in the first space 232A and the second run-over bus bar 336B may extend parallel to the first horizontal bus bar 230A and the second horizontal bus 230B bar in the first space 232A. The third run-over bus bar 336C may extend to the fourth cabinet assembly 102D without passing through a gap or between vertical bus bars 222. By locating at least some of the run-over bus bars 336 in the first space 232A, the back panel 306 may be located closer to the horizontal bus 228, which reduces the depth of the power distribution system 100. For example, the distance between the back panel 306 and the panels 106 may be less than in conventional power distribution systems.

The first space 232A may extend a distance D41 between the first horizontal bus bar 230A and the second horizontal bus bar 230B. The distance D41 may be approximately 3" (7.6 cm). The run-over bus bars 336 have a width D42, wherein the distance D41 is greater than the width D42, which enables the run-over bus bars 336 to fit in the first space 232A between the first horizontal bus bar 230A and the second horizontal bus bar 230B. The width D42 may be approximately 2" (5.1 cm). The first horizontal bus bar 230A may be separated from the run-over bus bars 336 by a distance D43 and the second horizontal bus bar 230B may be separated from the run-over bus bars 336 by a distance D44. The distances D43 and D44 may be equal and may be great enough to prevent the run-over bus bars 336 from arcing to either the first horizontal bus bar 230A or the second horizontal bus bar 230B. The distances D43 and D44 may be approximately 0.5" (1.3 cm) Braces and/or supports (not shown) may maintain the run-over bus bars 336 from contacting the horizontal bus bars 230.

A conductor 450 is shown extending from the terminal assembly 340. The conductor 450 may be electrically coupled to the third vertical bus bar 222C via a coupler 452. Both the third conductor 342C and the conductor 450 may be configured to be coupled to the first user interface 114A (FIG. 2). The first user interface 114A may control and/or monitor current flow between the third vertical bus bar 222C and the third run-over bus bar 336C. For example, the third vertical bus bar 222C may be coupled to a line side of a circuit breaker and the third run-over bus bar 336C may be coupled to the load side of the circuit breaker. Similar conductor configurations may be present for each of the vertical bus bars 222 (FIG. 3A) of the vertical bus 220 and each of the run-over bus bars 336 of the run-over bus 236.

Figure 5:
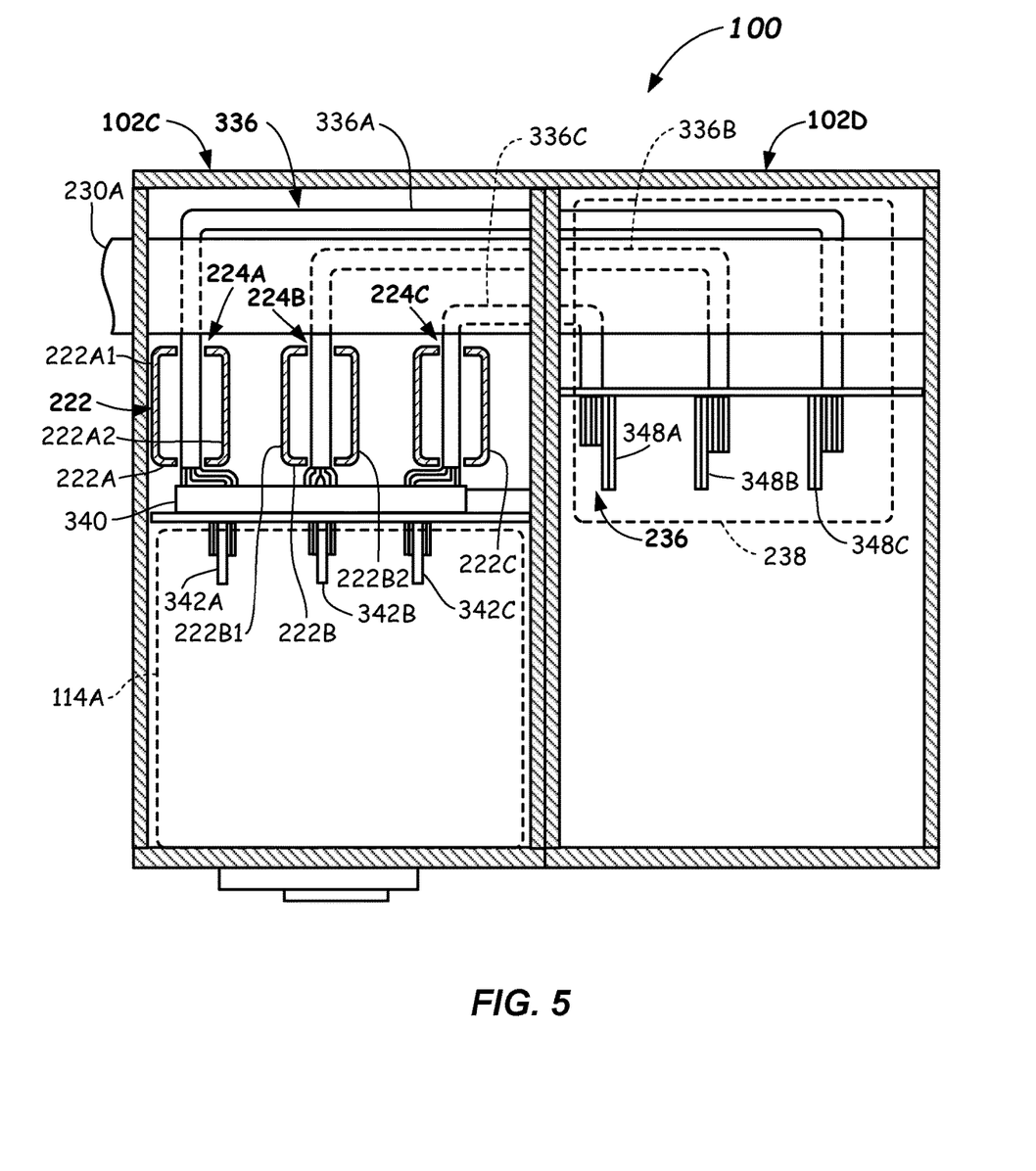
FIG. 5 illustrates a top, plan, cross-sectional view of portions of a power distribution system according to one or more embodiments.

The run-over bus 236 depicted in FIG. 3A includes two run-over bus bars 336A and 336B extending through the first gap 224A in the first vertical bus bar 222A and the second gap 224B in the second vertical bus bar 222B, respectively. Reference is made to FIG. 5, which illustrates an embodiment wherein all the run-over bus bars 336 of the run-over bus 236 extend through gaps 224A-224C in all the vertical bus bars 222. In such a configuration, the third run-over bus bar 336C may be routed in such a way so to pass through the first space 232A (FIG. 4). A portion of the third run-over bus bar 336C in the first space 232A may extend parallel to at least a portion of the first horizontal bus bar 230A and the second horizontal bus bar 230B. For example, cross-sections of the run-over bus bars 336 may be located entirely in the first space 232A and the run-over bus bars 336 may extend parallel to the first horizontal bus bar 230A and the second horizontal bus 230B bar in the first space 232A.

Figure 6:
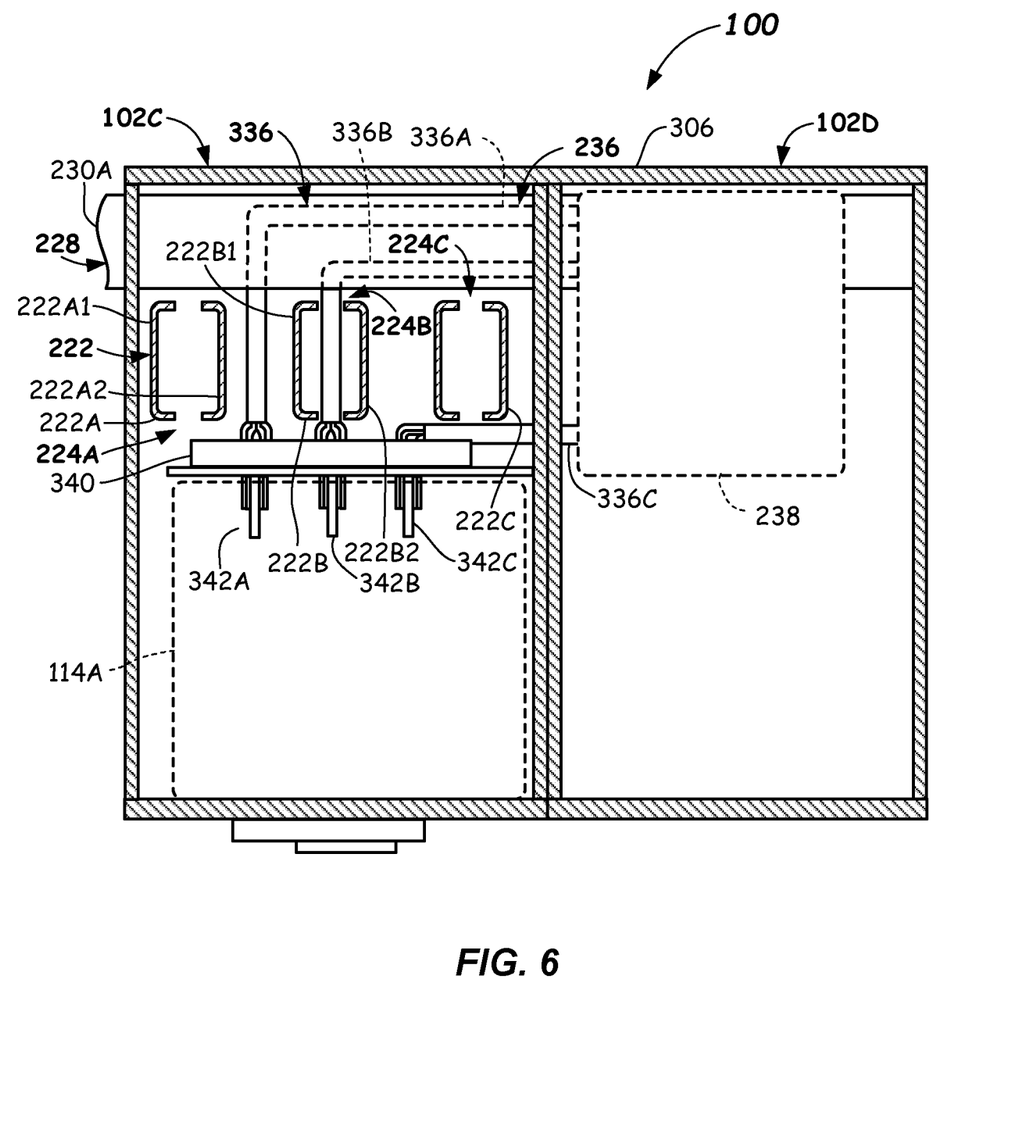
FIG. 6 illustrates a top, plan, cross-sectional view of portions of a power distribution system according to one or more embodiments.

Reference is now made to FIG. 6, which illustrates a top, cross-sectional view of portions of the power distribution system 100 including a different routing of the run-over bus 236. In the embodiment illustrated in FIG. 6, the first run-over bus bar 336A and the second run-over bus bar 336B at least partially extend in the first space 232A (FIG. 4). This configuration of the run-over bus bars 336 enables the back panel 306 to be located proximate the horizontal bus 228. For example, the back panel 306 may be located approximately 1" (2.54 cm) from the horizontal bus 228. In the embodiment illustrated in FIG. 6, the third run-over bus bar 336C may not pass through a gap 224A-224C in the vertical bus bars 222 or between the vertical bus bars 222. In addition, the first run-over bus bar 336A may extend between the first vertical bus bar 222A and the second vertical bus bar 222B rather than through one of the gaps 224A-224C. In some embodiments, none of the run-over bus bars 336 extend through any of the gaps 224A-224C.

The lug terminal assembly 238 of FIG. 6 is shown as a block. The lug terminal assembly 238 may configure conductors (not shown in FIG. 6) coupled to the run-over bus 236 in different patterns. For example, the conductors may be positioned from left to right as A-phase through C-phase or from top to bottom as A-phase through C-phase.

Figure 7:
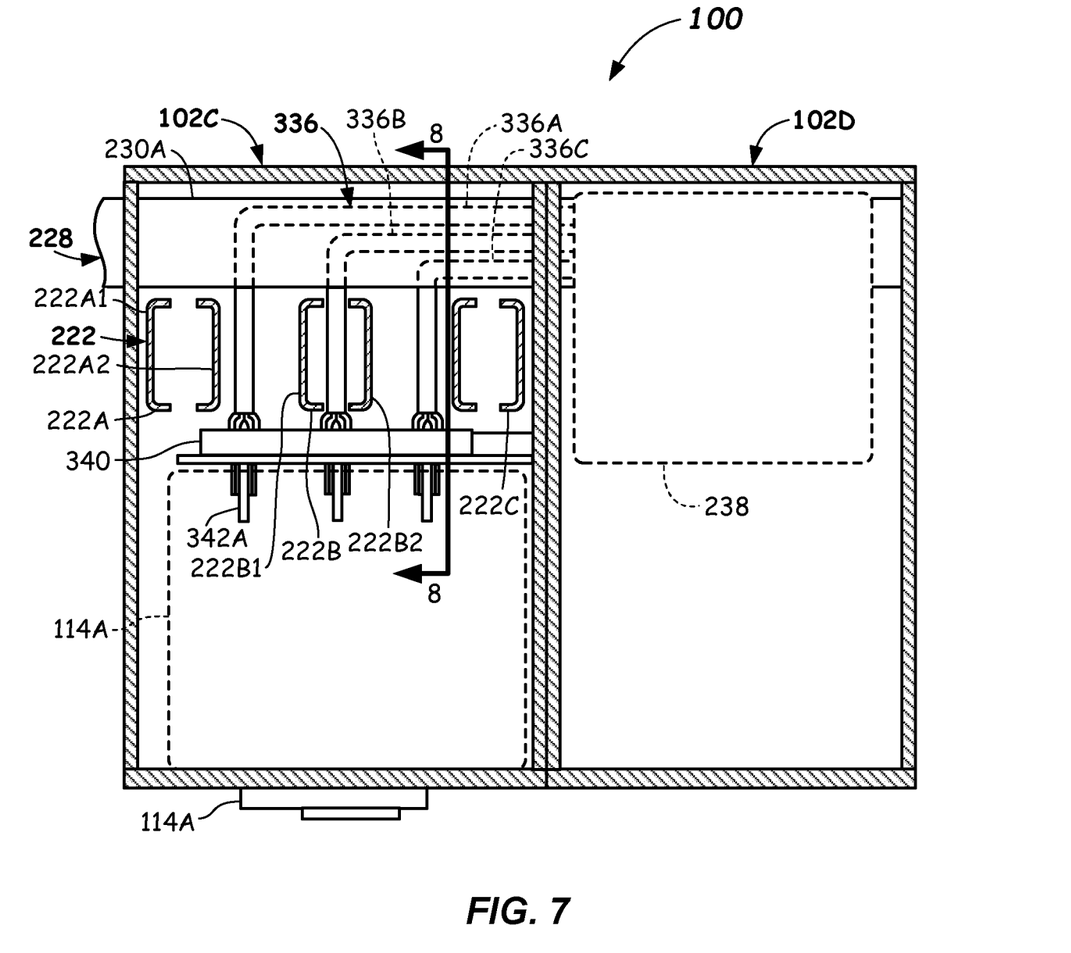
FIG. 7 illustrates a top, plan, cross-sectional view of portions of a power distribution system according to one or more embodiments.
Figure 8:
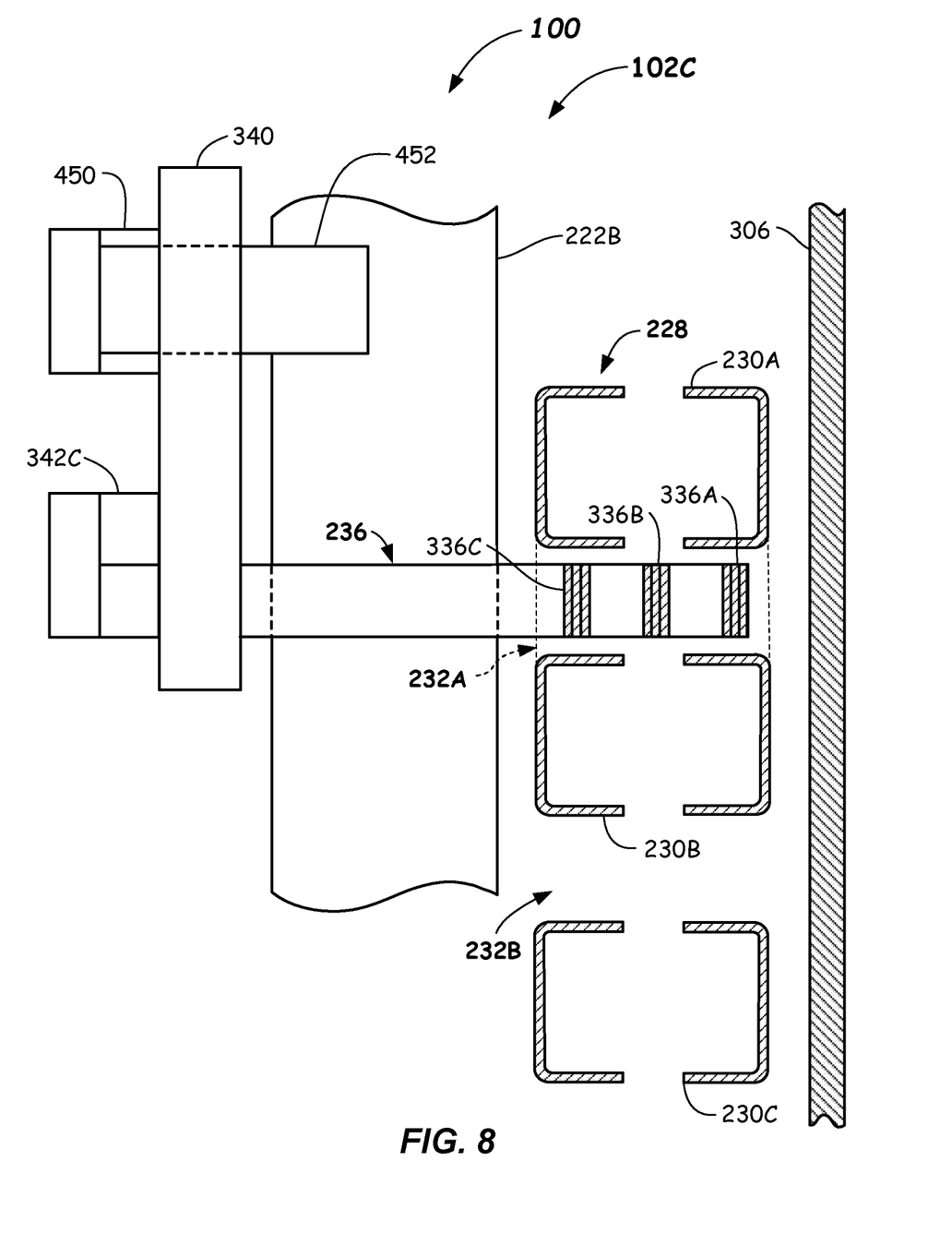
FIG. 8 illustrates a partial cross-sectional view of a cabinet assembly of a power distribution system and the location of a run-over bus relative to bus bars according to one or more embodiments.

Reference is now made to FIGS. 7 and 8. FIG. 7 illustrates a top, cross-sectional view of portions of the power distribution system 100 including a different routing of the run-over bus 236. FIG. 8 illustrates a side, cross-sectional view of the power distribution system 100 of FIG. 7. In the embodiment illustrated in FIGS. 7 and 8, the run-over bus bars 336 at least partially extend in the first space 232A. For example, cross-sections of the run-over bus bars 336 may be located entirely in the first space 232A and the run-over bus bars 336 may extend parallel to the first horizontal bus bar 230A and the second horizontal bus 230B bar in the first space 232A. This configuration of the run-over bus bars 336 enables the back panel 306 to be located proximate the horizontal bus 228. For example, the back panel 306 may be located approximately 1" (2.54 cm) from the horizontal bus 228. In the embodiment illustrated in FIGS. 7 and 8, the portions of the run-over bus bars 336 extending parallel to the horizontal bus 228 may be close enough to be braced together. In addition to the foregoing, the first run-over bus bar 336A and the third run-over bus bar 336C may extend between vertical bus bars 222 rather than through the gaps 224A-224C.

The lug terminal assembly 238 of FIGS. 7 and 8 are shown as a block. The lug terminal assembly 238 may configure conductors (not shown in FIG. 7) coupled to the run-over bus 236 in different patterns. For example, the conductors may be positioned from left to right as A-phase through C-phase or from top to bottom as A-phase through C-phase.

Figure 9:
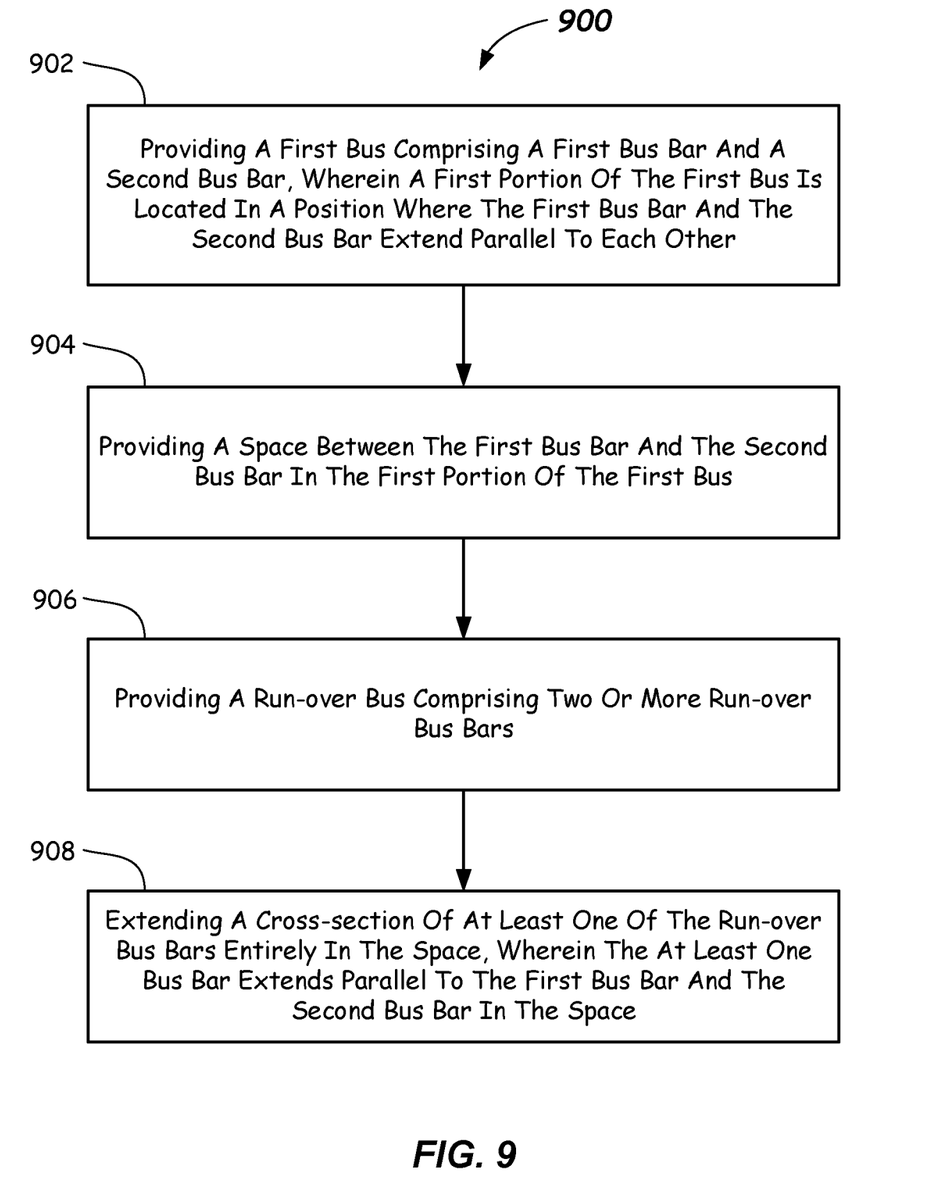
FIG. 9 illustrates a flowchart describing a method of manufacturing a power distribution system according to one or more embodiments.

In another aspect, a method of manufacturing a power distribution system (e.g., power distribution system 100) is illustrated by the flowchart 900 of FIG. 9. The method may include, in 902, providing a first bus (e.g., horizontal bus 228) comprising a first bus bar (e.g., first horizontal bus bar 230A) and a second bus bar (e.g., second horizontal bus bar 230B), wherein a first portion of the first bus is located in a position where the first bus bar and the second bus bar extend parallel to each other. The method may include, in 904, providing a space (e.g., first space 232A) between the first bus bar and the second bus bar in the first portion of the first bus. The method may include, in 906, providing a run-over bus (e.g., run-over bus 236) comprising two or more run-over bus bars (e.g., run-over bus bars 336). The method may include, in 908, extending a cross-section of at least one of the run-over bus bars entirely in the space, wherein the at least one bus bar extends parallel to the first bus bar and the second bus bar in the space.

It should be readily appreciated that the present disclosure is susceptible of broad utility and application. Many embodiments and adaptations of the present disclosure other than those herein described, as well as many variations, modifications, and equivalent arrangements, will be apparent from, or reasonably suggested by, the present disclosure and the foregoing description thereof, without departing from the substance or scope of the present disclosure. Accordingly, while the present disclosure has been described herein in detail in relation to specific embodiments, it is to be understood that this disclosure is only illustrative and presents examples of the present disclosure and is made merely for purposes of providing a full and enabling disclosure. This disclosure is not intended to be limiting to the particular apparatus, assemblies, systems and/or methods disclosed, but, to the contrary, the intention is to cover all modifications, equivalents, and alternatives falling within the scope of the claims.

What is claimed is:

1. A power distribution system, comprising:
a first bus comprising a first bus bar and a second bus bar;
a first portion of the first bus located in a position where the first bus bar and the second bus bar extend parallel to each other;
a space between the first bus bar and the second bus bar in the first portion of the first bus;
a run-over bus comprising two or more run-over bus bars, wherein a cross-sectional portion of at least one of the run-over bus bars is located in the space, and wherein the at least one run-over bus bar extends parallel to the first bus bar and the second bus bar in the space; and
a terminal assembly and a lug terminal assembly, wherein the run-over bus is electrically coupled between the lug terminal assembly and the terminal assembly.

2. The power distribution system of claim 1, wherein a cross-section of at least one of the run-over bus bars is located entirely in the space, and wherein the at least one run-over bus bar extends parallel to the first bus bar and the second bus bar in the space.

3. The power distribution system of claim 1, wherein cross-sections of two or more of the run-over bus bars are located entirely in the space, and wherein the two or more run-over bus bars extend parallel to the first bus bar and the second bus bar.

4. The power distribution system of claim 1, wherein the first bus bar and the second bus bar are configured to conduct different phases of a voltage.

5. The power distribution system of claim 1, further comprising a first cabinet assembly and a second cabinet assembly, wherein the first bus extends at least partially within the first cabinet assembly, and wherein the run-over bus extends between the first cabinet assembly and the second cabinet assembly.

6. The power distribution system of claim 1, wherein the run-over bus comprises at least three run-over bus bars, wherein cross-sections of first and second run-over bus bars are located entirely in the space and at least portions of the first and second run-over bus bars extend parallel to the first bus bar and the second bus bar, and where a third run-over bus bar is not located between the first bus bar and the second bus bar.

7. The power distribution system of claim 1, further comprising a second bus including at least two second bus bars, each second bus bar including a first channel, a second channel, and a gap between the first channel and the second channel, wherein at least one run-over bus bar extends through a gap or between two second bus bars, and wherein at least one run-over bus bar does not extend through a gap or between two second bus bars.

8. The power distribution system of claim 1, further comprising a second bus including at least two second bus bars, each first bus bar including a first channel, a second channel, and a gap between the first channel and the second channel, wherein at least one run-over bus bar extends through a gap or between two second bus bars, and wherein first bus extends horizontally and the second bus extends vertically.

9. The power distribution system of claim 1, further comprising a first cabinet assembly and a second cabinet assembly, wherein a second bus extends vertically within the first cabinet assembly, and wherein the run-over bus extends horizontally between the first cabinet assembly and the second cabinet assembly.

10. The power distribution system of claim 9, further comprising a circuit breaker electrically coupled between the second bus and the run-over bus.

11. A power distribution system, comprising:
a first bus comprising a first bus bar and a second bus bar;
a first portion of the first bus located in a position where the first bus bar and the second bus bar extend parallel to each other;
a space between the first bus bar and the second bus bar in the first portion of the first bus;
a run-over bus comprising two or more run-over bus bars, wherein a cross-sectional portion of at least one of the run-over bus bars is located in the space, and wherein the at least one run-over bus bar extends parallel to the first bus bar and the second bus bar in the space; and
a second bus including at least two second bus bars, each second bus bar including a first channel, a second channel, and a gap between the first channel and the second channel, wherein at least one run-over bus bar extends through a gap.

12. A power distribution system, comprising:
a first cabinet assembly;
a second cabinet assembly;
a horizontal bus extending between the first cabinet assembly and the second cabinet assembly, the horizontal bus comprising a first horizontal bus bar and a second horizontal bus bar vertically aligned with the first horizontal bus bar;
a first portion of the horizontal bus located in a position where the first horizontal bus bar and the second horizontal bus bar extend parallel to each other;
a space between the first horizontal bus bar and the second horizontal bus bar in the first portion of the horizontal bus; and
a run-over bus extending between the first cabinet assembly and the second cabinet assembly, the run-over bus comprising two or more run-over bus bars, wherein a cross-section of at least one of the run-over bus bars is located entirely in the space, and wherein the at least one run-over bus bar extends parallel to the first horizontal bus bar and the second horizontal bus bar in the space,
wherein the first cabinet assembly comprises a circuit breaker, wherein the second cabinet assembly comprises a lug terminal assembly, and wherein the run-over bus electrically couples the circuit breaker to the lug terminal assembly.

13. The power distribution system of claim 12, wherein the run-over bus comprises at least three run-over bus bars, wherein cross-sections of first and second run-over bus bars are located entirely in the space, wherein the first and second run-over bus bars extend parallel to the first horizontal bus bar and the second horizontal bus bar in the space, and where a third run-over bus bar is not located between the first horizontal bus bar and the second horizontal bus bar.

14. The power distribution system of claim 12, further comprising a vertical bus including at least two vertical bus bars, each vertical bus bar including a first channel, a second channel, and a gap between the first channel and the second channel, wherein at least one run-over bus bar extends through a gap.

15. The power distribution system of claim 12, further comprising a vertical bus including at least two vertical bus bars, each vertical bus bar including a first channel, a second channel, and a gap between the first channel and the second channel, wherein at least one run-over bus bar extends through a gap or between two horizontal bus bars, and wherein at least one run-over bus bar does not extend through a gap or between two horizontal bus bars.

16. The power distribution system of claim 12, wherein cross-sections of the two or more of the run-over bus bars are located entirely in the space, and the two or more run-over bus bars extend parallel to the first horizontal bus bar and the second horizontal bus bar in the space.

\* \* \* \* \*